United States Patent [19]

Reulecke et al.

[11] Patent Number: 4,652,367
[45] Date of Patent: Mar. 24, 1987

[54] FILTER FOR THE FILTRATION OF FLUIDS

[75] Inventors: Fritz Reulecke, Adelebsen; Günter Pradel, Göttingen, both of Fed. Rep. of Germany

[73] Assignee: Sartorius GmbH, Fed. Rep. of Germany

[21] Appl. No.: 795,885

[22] Filed: Nov. 7, 1985

[30] Foreign Application Priority Data

Nov. 17, 1984 [DE] Fed. Rep. of Germany ....... 3442191

[51] Int. Cl.$^4$ ............................................. B01D 29/04
[52] U.S. Cl. ..................................... 210/94; 210/448; 210/450; 210/453
[58] Field of Search ............... 210/446, 447, 448, 450, 210/453, 493.2, 927, 94

[56] References Cited

U.S. PATENT DOCUMENTS

| | | | |
|---|---|---|---|
| 1,088,307 | 2/1914 | Vinquist | 210/453 |
| 2,839,056 | 6/1958 | Mailly | 210/453 |
| 3,361,261 | 1/1968 | Fairey et al. | 210/450 |
| 4,113,627 | 7/1978 | Leason | 210/446 |
| 4,116,844 | 9/1978 | Hein et al. | 210/446 |
| 4,362,621 | 12/1982 | Dogna et al. | 210/450 |

FOREIGN PATENT DOCUMENTS

| | | |
|---|---|---|
| 75405 | 3/1983 | European Pat. Off. . |
| 1972513 | 11/1967 | Fed. Rep. of Germany . |
| 2222004 | 11/1973 | Fed. Rep. of Germany . |
| 8377223 | 7/1984 | Fed. Rep. of Germany . |

Primary Examiner—John Adee
Attorney, Agent, or Firm—Eric P. Schellin

[57] ABSTRACT

In a filter with fluid connections, an upper housing part (1) and a lower housing part (8) a flat filter blank (7) is sealingly clamped in like a sandwich between their circular and circumferential opening edges (6) and flange parts (11) in such a manner between the interconnected housing parts (1,8) that fluid can penetrate from one housing part (1) into the other housing part (8) only through the selectively permeable flat filter blank (7). The one housing part comprises threads (5) on the cylindrical outer edge of its opening edge facing the flat filter blank (7) and the connection of both housing parts (1,8) consists of a sprayed-on plastic ring (12) which holds the two housing parts (1,8) with flat filter blank (7) in a sealing and clamping position, completely fills up the threads (5) of the one housing part (1) and extends over the edge (11) of the other housing part (8) like a detachable union nut, so that a detachable housing connection is formed and the flat filter blank (7) can be removed from the filter housing for further testing.

10 Claims, 2 Drawing Figures

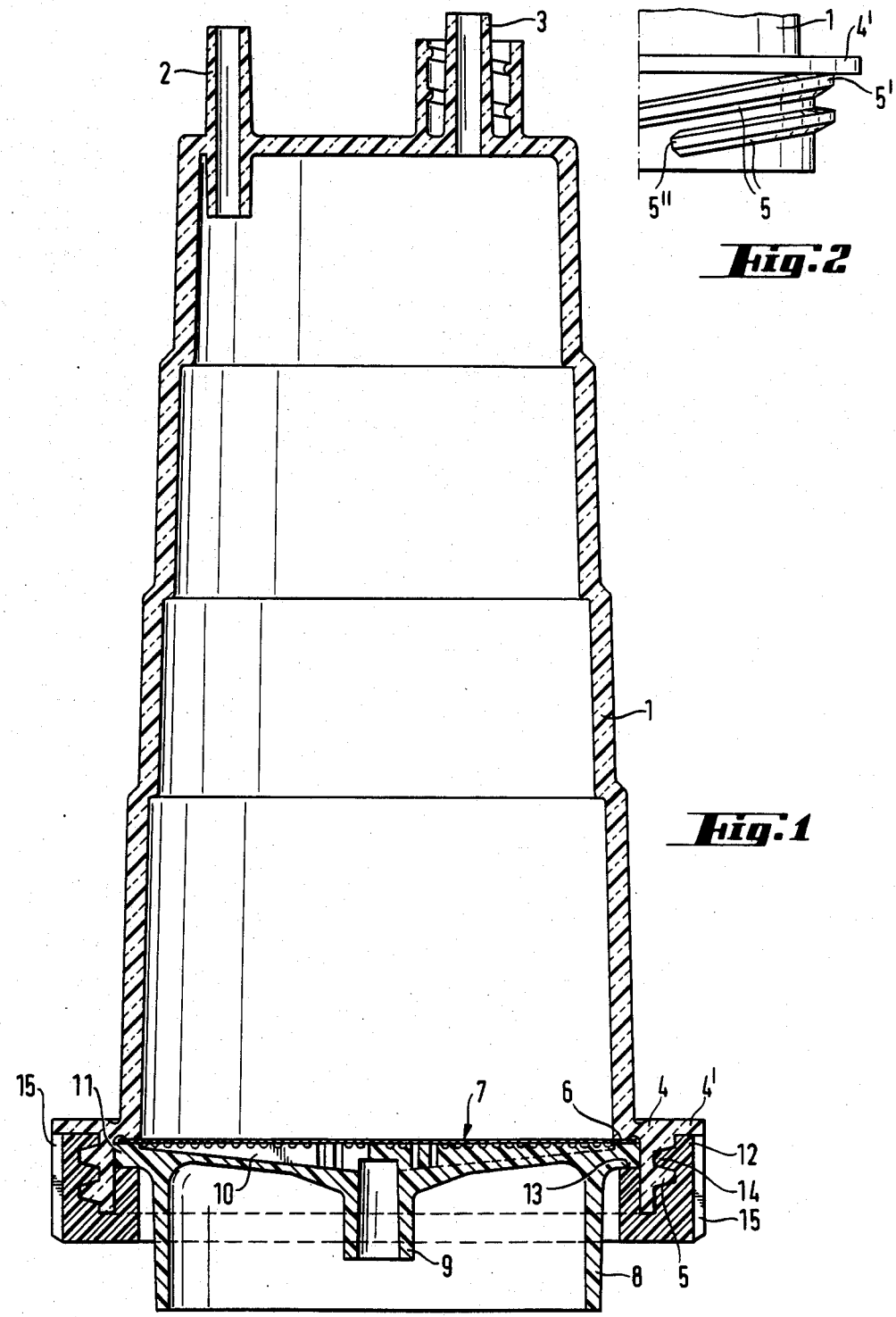

FILTER FOR THE FILTRATION OF FLUIDS

The invention is relative to a filter for the filtration of fluids with fluid connections, a first housing part and a second housing part between whose circular and circumferential opening edges or flange parts a removable filter element is sealingly clamped in like a sandwich by its periphery in such a manner between the interconnected housing parts that fluid can penetrate from the one housing part into the other housing part only through the filter, whereby the one housing part comprises threads on the jacket of its opening edge facing the filter element. Such filters are used for the filtration of liquids and gases.

Such a filter in accordance with the generic part of the main claim is known, for example, from German utility model No. 83 37 223. The plastic housing parts are sealingly connected by a screw connection and an elastic O ring seal with inclusion of a flat filter blank. As a result of the screw connection, the flat filter blank can be removed from the housing after a filtration for further tests. The known device is also suitable for pressure filtration, whereby both housing parts are screwed directly together. In another known device (EP - OS 75 405) the screw connection is achieved by a threaded ring which functions as a union nut.

If, on the other hand, two plastic housing parts are detachably connected to one another with the inclusion of a flat filter blank without the inclusion of an elastic O ring by a plastic union nut, a cold flow of the threads resting on each other frequently develops if the latter have to be tightened against each other in order to generate a strong pressure in the area of the area to be sealed. The initially good and tight press fit of the connected part can become weaker as a result of a reduction of the elasticity (relaxation) during shrinkage and ageing of the plastic, which leads to leakages at the connection area. On the other hand, the use of O ring seals is not always desirable with aggressive media and for microbiological reasons, because particles and microorganisms can travel under the elastic sealing seat, therewith avoiding a rinsing process, for example.

It is also already known (U.S. Pat. No. 4, 113, 627) in small filters suitable for the front part of a syringe or for infusion filters that two plastic housing parts which rest on one another with their flanges with inclusion of a flat filter blank can be sprayed permanently with a plastic closure ring, whereby recesses of the upper housing part and of the lower housing part are covered over and completely filled up. Such a connection is largely gas tight and very pressure-resistant; however, it can not be detached, so that the filter element can not be removed. This also applies to a cylindrical filter element according to DE - OS No. 22 22 004 and DE - GM No. 19 72 513.

The invention therefore has the task of improving with simple means a filter of the type initially described in such a manner that O rings as sealing means can be eliminated in its sealing structure, whereby the excellent tight and pressure-resistant clamping of the periphery of the filter element between the housing parts as well as the easy accessibility to the filter element and the possibility of removing it remain preserved.

The invention as characterized in the claims solves the task of creating a filter for the filtration of fluids in which the connection of both housing parts consists of a sprayed-on plastic ring which holds both housing parts with the filter element in the sealing and clamping position, which completely fills up the threads of the one housing part and which extends over the edge of the other housing part like a detachable union nut, whereby the specific melting point of the plastic ring is lower than the specific melting point of the housing part which comprises the threads for the plastic ring.

Advantageous variants are indicated in the subclaims.

The construction of the invention assures a complete filling of the threads while at the same time the pairing of the work materials assures that the coefficient of friction between the formed thread and the sprayed-on counterthread makes it possible to loosen the connection area relatively easily, so that a detachable and pressure-resistant connection between the housing parts is created and the filter element can be removed for further tests.

The advantages achieved by the invention conist in that along with the possibility of removing the filter element on account of the lack of an O ring seal between the part to be sealed, this connection is also especially well-suited for use in the microbiological area. The defined nonelastic clamping of the filter element between the housing edges prevents anything from traveling under the sealing seat.

The invention is described in more detail below with reference made to the drawings, which show only one embodiment.

FIG. 1 shows a vertical section through a plastic filter.

FIG. 2 shows a detail view of the one housing part in the area of the thread start and the thread end.

The filter device, suitable for pressure filtration, sterility tests and microbiological tests, consists of transparent upper housing part 1 of two obturatable inlets 2 and 3 and of lower housing part 8 or filter table, likewise of plastic. Lower container edge 6 limits the free filter area of flat filter blank 7, which can be clamped in like a sandwich between this container edge 6 and circumferential plane flange 11 of lower housing part 8. Lower housing part 8 comprises a draining filter support 10 which terminates in outlet 9. Upper housing part 1 comprises circumferential shoulder 4 which merges into a cylindrical outer edge on which threads of a multiple threading are formed which are trapezoidal, for example, in cross section.

As is evident from the detail view of figure 2, shoulder 4 is extended so far radially that its shoulder extension 4' forms a radial and axial form limit on the bottom for plastic ring 12 to be sprayed on, whereby thread 5 or threads 5 run(s) with its (their) thread end 5' into the bottom of shoulder extension 4'. Thread start 5" is constructed as a solid section, which avoids a deformation by spraying on plastic ring 12.

In principle, all thread types with continuous threads are possible, namely, round threads, buttress threads and flat threads. The choice depends on the work material pairing in order to define the amount of friction in the threading. The two housing parts 1 and 8 are pressed against one another into a sealing position with inclusion of flat filter blank 7 or another filter element in the form tool for plastic ring 12 to be sprayed on. Plastic ring 12 is sprayed on in this state and both housing parts 1 and 8 are maintained pressed together until plastic ring 12 hardens. The plastic of closure ring 12 is pressed completely into threads 5 and forms support 13 for the bottom of the second housing part or of filter table 8. For its part, sprayed-on plastic ring 12 has retained its threads 14 thereby, which correspond to threads 5 of the other housing part 1 and can be detached from them in a circumferential direction by a rotating movement. The specific melting point or the working temperature of the plastic for plastic ring 12 in the forming tool is so low that a melting and deforming of threads 5 of the one housing part 1 are avoided. It is also preferable if the melting point of the other housing part 8 is higher than that of plastic ring 12. Both housing parts 1 and 8 can therewith be detached from one another and flat filter blank 7 and its associated filter element can be removed from filter housing 1, 8 for further tests. A new seal over hardened plastic ring 12 is not provided. Several gripping grooves 15 or projections are formed on the circumference of plastic ring 12 to make it easier to handle during loosening. Upper housing part 1 consists, for example, of polycarbonate, sprayed on plastic ring 12 of polyamide and filter table 8 of SAN styroacrylnitrile.

According to the illustration, thread 4 is located on the outer jacket of the circular opening edge of housing part 1. Alternatively, the thread can be located on the inner jacket of the housing part. The jacket area enclosed by plastic ring 12 can exhibit a conicity thereby which makes it easier to remove the plastic ring. Threads 5 are preferably constructed as multiple short threads to make it easier to remove the plastic ring.

Hoses, ventilation filters or other accessory parts customary in the laboratory can be adapted to connecting pieces 2, 3, and 9. As is clear from the sectional drawing, the connection is suitable for receiving both high axial pressures as well as high radially acting pressures. The embodiment of the filter device shown is constructed as a nonreusable plastic housing, that is, as a disposable article or a socalled throw-away unit which is sterilized and ready for use.

Instead of a flat filter blank, the filter element can also consist of a cylindrical filter element with a sealing flange which can also be removed from the filter housing for further tests.

It can be advantageous for specific applications to construct lower housing part 8 of metal and make it reusable.

We claim:

1. In a pressure filter for filtration of fluids with fluid connections, having a first housing part and a second housing part between whose circular and circumferential opening edges or flange parts a removable filter element is sealingly clamped in like a sandwich by its periphery in such a manner between the interconnected housing parts that fluid can penetrate from the one housing part into the other housing part only through the filter, whereby the one housing part comprises threads on the jacket of its opening edge facing the filter element, the improvement wherein a presure resistant connection for both housing parts (1,8) consists of a sprayed-on counter thread plastic ring (12) which holds both housing parts (1,8) with filter element (7) in a sealing and clamping position, and completely fills up the threads (5) of the one housing part (1) and extends over the edge (11) of the other housing part (8) as a detachable union nut, the specific melting point of said sprayed-on counter thread plastic ring 12 is lower than the specific melting point of the threads (5) on housing part (1).

2. Filter according to claim 1, characterized in that the housing part (1) comprising threads 5 is made of plastic.

3. Filter according to claim 1 or 2, characterized in that plastic ring (12) and housing part (8) without threads (5) consist of the same plastic.

4. Filter according to claim 1, characterized in that both housing parts (1,8) consist of plastic having specific melting points higher than that of sprayed-on counter thread plastic ring (12).

5. Filter according to claim 4, characterized in that the thread (5) is a multiple thread.

6. Filter according to claim 5, characterized in that the sprayed-on counter thread plastic ring (12) comprises gripping grooves (15) or projections on its outside.

7. Filter according to claim 6, characterized in that the housing part (1) provided with threads (5) consists of polycarbonate and the sprayed-on counter thread plastic ring (12) of polyamide.

8. Filter according to claim 6, characterized in that the threads (5) of the one housing part (1) are limited in an axial direction by a radially projecting shoulder (4,4') of this housing part and that this shoulder is shaped as an axial and radial limiting surface for the sprayed-on counter thread plastic ring (12), whereby the thread (5) runs with its thread end (5') into the bottom of the shoulder (4,4').

9. Filter according to claim 8, characterized in that the thread start (5") of the housing part (1) carrying the thread (5) beings with the full thread cross section.

10. Filter according to claims 1 or 2 or 4 or 8 or 9, characterized in that for a visual and microbiological check and testing at least one housing part (1) consists of transparent plastic and the filter element is formed by a flat filter blank (7) which faces this housing part (1) with one of its sides.

* * * * *